(12) United States Patent
Kumar et al.

(10) Patent No.: US 9,154,787 B2
(45) Date of Patent: Oct. 6, 2015

(54) SUB-BLOCK LEVEL PARALLEL VIDEO CODING

(71) Applicant: Qualcomm Incorporated, San Diego, CA (US)

(72) Inventors: Sanjeev Kumar, Bangalore (IN); Hsiao-Chiang Chuang, San Diego, CA (US); Shu Xiao, San Diego, CA (US); Kai Wang, San Diego, CA (US); Xianglin Wang, San Diego, CA (US); Wei-Jung Chien, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 13/744,128

(22) Filed: Jan. 17, 2013

(65) Prior Publication Data

US 2013/0188701 A1    Jul. 25, 2013

Related U.S. Application Data

(60) Provisional application No. 61/588,623, filed on Jan. 19, 2012, provisional application No. 61/591,651, filed on Jan. 27, 2012.

(51) Int. Cl.
*H04N 19/50* (2014.01)
*H04N 19/436* (2014.01)
*H04N 19/11* (2014.01)
*H04N 19/156* (2014.01)
*H04N 19/174* (2014.01)

(52) U.S. Cl.
CPC ....... *H04N 19/00569* (2013.01); *H04N 19/436* (2014.11); *H04N 19/11* (2014.11); *H04N 19/156* (2014.11); *H04N 19/174* (2014.11)

(58) Field of Classification Search
None
See application file for complete search history.

(56) References Cited

U.S. PATENT DOCUMENTS

| | | |
|---|---|---|
| 2008/0240242 A1 | 10/2008 | Lainema |
| 2011/0249733 A1 | 10/2011 | Zhao et al. |
| 2011/0310976 A1 | 12/2011 | Wang et al. |
| 2012/0163452 A1 | 6/2012 | Horowitz |
| 2014/0205008 A1* | 7/2014 | Wu .......................... 375/240.12 |

FOREIGN PATENT DOCUMENTS

WO    2012034690 A1    3/2012

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

The techniques of this disclosure are generally related to parallel coding of video units that reside along rows or columns of blocks in largest coding units. For example, the techniques include removing intra-prediction dependencies between two video units in different rows or columns to allow for parallel coding of rows or columns of the video units.

32 Claims, 7 Drawing Sheets

(56) References Cited

OTHER PUBLICATIONS

International Search Report and Written Opinion from International Application No. PCT/US2013/022184, dated May 13, 2013, 13 pp.

Segall et al., "Parallel Intra Prediction for Video Coding," 28th Picture Coding Symposium, PCS2010, Dec. 8-10, 2010, XP002695359, IEEE Computer Society USA, DOI: 10.1109/PCS.2010.5702495, 4 pp.

Zhao et al., "CE6: Parallel Prediction Unit for Parallel Intra Coding," 4th Meeting, 95. MPEG Meeting; Jan. 20-28, 2011; Daegu, KR; (Motion Picture Expert Group or ITU-T SG16 WP3 and ISO/IEC JTC1/SC29/WG11); No. M18824, XP030047393; 10 pp.

Zhao et al., "CE6.D Parallel Intra Coding," JCT-VC Meeting; MPEG Meeting; Jul. 14-22, 2011; Torino, IT; (Joint Collaborative Team on Video Coding of ITU-T SG16 WP3 and ISO/IEC JTC1/SC29/WG11); URL: http://wftp3.itu.int/av-arch/jctvc-site/, No. JCTVC-F605, XP030009628, 5 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2013, 317 pp.

International Preliminary Report on Patentability from International Application No. PCT/US2013/022184, dated Apr. 9, 2014, 10 pp.

Second Written Opinion from International Application No. PCT/US2013/022184, dated Jan. 28, 2014, 9 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, Jctvc-G1103_d2, 214 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 10th Meeting: Geneva, CH, Jan. 14-23, 2013, JCTVC-L1003_v34, 310 pp.

\* cited by examiner

| 0 | 1 | 2 | 3 | 4 | 5 | 6 | 7 |
|---|---|---|---|---|---|---|---|
| T1 | T2 | T5 | T6 | ... | | | |
| | | T3 | T4 | T7 | T8 | ... | |
| | | | | B1 | B2 | ... | |
| | | | | | | B3 | B4 |

FIG. 6

| 0 | 1 | 2 | 3 | 4 | 5 | 6 | 7 |
|---|---|---|---|---|---|---|---|
| T1 | T2 | T5 | T6 | ... | | | |
| | T3 | T4 | T7 | T8 | ... | | |
| | | | B1 | B2 | ... | | |
| | | | | B3 | B4 | ... | |

FIG. 7

| 0 | 1 | 2 | 3 | 4 | 5 | 6 | 7 |
|---|---|---|---|---|---|---|---|
| T1 | T2 | T5 | T6 | ... | | | |
| | T3 | T4 | T7 | T8 | ... | | |
| | | B1 | B2 | ... | | | |
| | | | B3 | B4 | ... | | |

FIG. 8

SUB-BLOCK LEVEL PARALLEL VIDEO CODING

This application claims the benefit of U.S. Provisional Patent Application No. 61/588,623, filed on Jan. 19, 2012, and U.S. Provisional Patent Application No. 61/591,651, filed Jan. 27, 2012, the contents of each of which are incorporated by reference herein.

TECHNICAL FIELD

This disclosure relates to video coding, and more particularly to techniques for the parallel coding of video blocks.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. A video frame alternatively may be referred to as a picture. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded, i.e., the coded block, and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure is related to techniques for coding a first row or column of different blocks of video data in parallel with coding a second row or column of the different blocks. In some examples, to achieve such parallel coding, the techniques may include making a coding unit located in the second row or column of a first block unavailable for predicting a coding unit located in the first row or column of a second block. In this way, it may be possible to code a first row or column of both the first and second blocks in parallel with coding a second row or column of both the first and second blocks.

In one example, this disclosure is directed to a method of coding video that includes coding a first plurality of coding units in a tile of video data, and coding a second plurality of coding units in the tile of video data substantially in parallel with coding the first plurality of coding units. Coding the first plurality and the second plurality of coding units includes intra-prediction coding. The intra-prediction coding uses no intra-prediction dependency between a portion of one coding unit in the first plurality of coding units and at least one adjacent coding unit in the second plurality of coding units.

In one example, this disclosure is directed to a video coder configured to perform a method of coding video that includes coding a first plurality of coding units in a tile of video data, and coding a second plurality of coding units in the tile of video data substantially in parallel with coding the first plurality of coding units. Coding the first plurality and the second plurality of coding units includes intra-prediction coding. The intra-prediction coding uses no intra-prediction dependency between a portion of one coding unit in the first plurality of coding units and at least one adjacent coding unit in the second plurality of coding units.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram depicting 4× parallelism coding scheduling according to one example of the disclosure.

FIG. 7 is a conceptual diagram depicting 4× parallelism coding scheduling according to another example of the disclosure.

FIG. 8 is a conceptual diagram depicting 4× parallelism coding scheduling according to another example of the disclosure.

DETAILED DESCRIPTION

This disclosure describes techniques for the parallel coding of video data. Parallel coding of video data, in particular, parallel coding of rows or columns of blocks of video data, is not always possible or feasible due to coding dependencies between blocks of video data in rows or columns. As one example, coding a block of video data in an upper row of video blocks at the same time as coding a block of video data in a row below (or below and to the left of) that block may not be possible because a coding process for the block in the upper row may depend on an already coded block in the row below. In particular, intra-prediction coding may not be possible because the block in the upper row depends on having available already coded values in the block below, such that the block below is a cause block for purposes of coding the block in the upper row. As such, parallel coding of rows of blocks of video data may not be feasible.

In view of these drawbacks, this disclosure presents techniques for parallel coding of video data. In some examples, these techniques include coding a first plurality of coding units in a tile of video data, and coding a second plurality of coding units in the tile of video data substantially in parallel with coding the first plurality of coding units. Coding the first plurality and the second plurality of coding units includes intra-prediction coding. According to example techniques of this disclosure, the intra-prediction coding uses no intra-prediction dependency between a portion of one coding unit in the first plurality of coding units and at least one adjacent coding unit in the second plurality of coding units. In this way, parallel coding may be achieved while still preserving intra-prediction coding techniques for a majority of the coding units in the first plurality of coding units.

Figure 1:
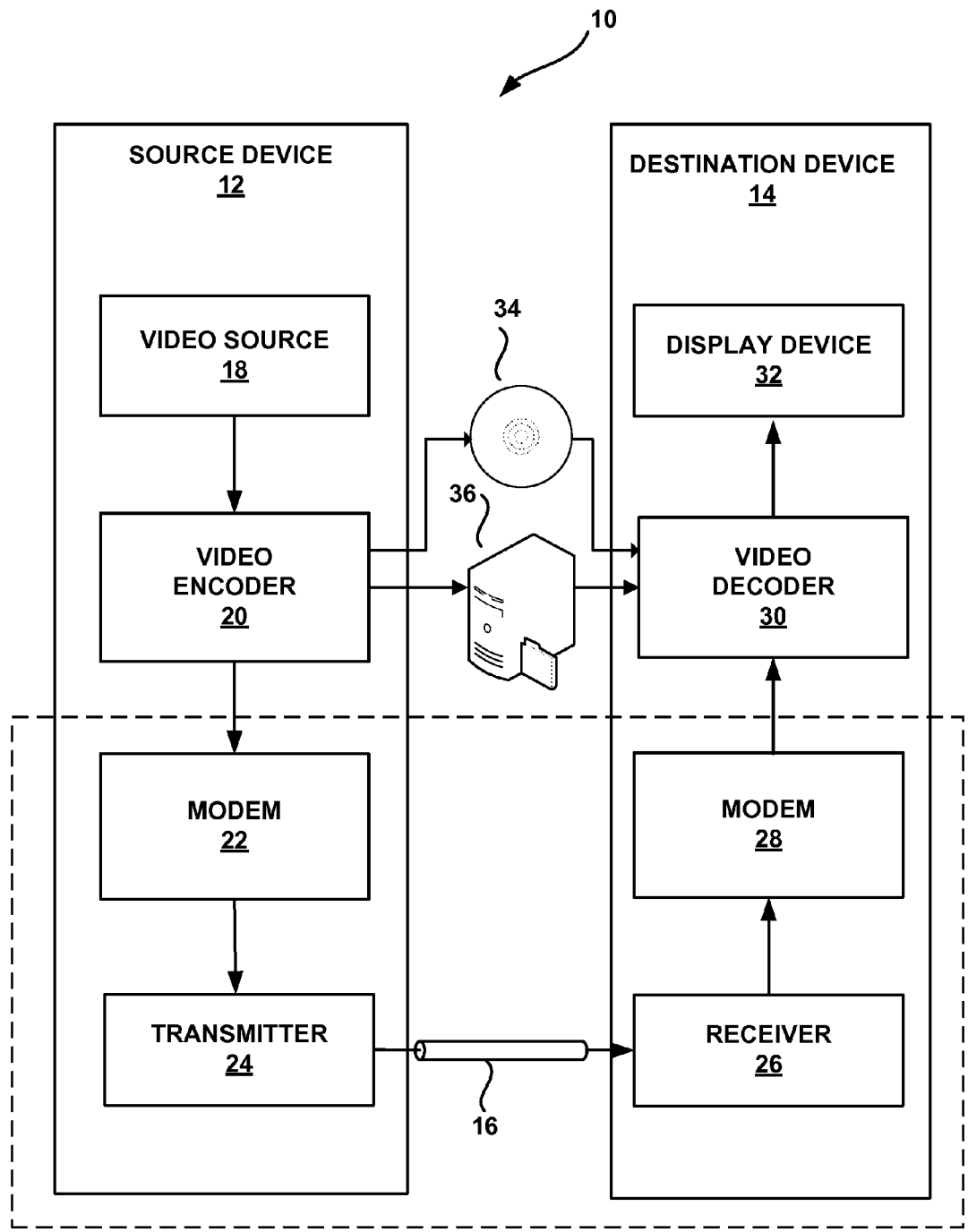
FIG. 1 is a block diagram illustrating an example video encoding and decoding system that may be configured to utilize techniques for parallel coding of this disclosure.

FIG. 1 is a block diagram illustrating an example video encoding and decoding system 10 that may be configured to utilize techniques for parallel coding of video coding units that reside on different rows or columns. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for parallel coding of video coding units, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent latest Working Draft (WD) of HEVC, and referred to as HEVC WD8 hereinafter, is available from http://phenix.int-evry.fr/jct/doc_end_user/documents/10_Stockholm/wg11/JCTVC-J1003-v8.zip as of Jan. 15, 2013.

Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for parallel coding of video coding units. Likewise, video decoder 30 may implement any or all of these techniques for parallel coding of video coding units. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, video encoder 20 may be configured to perform a method of coding video that includes coding a first portion of coding units in a tile of video data, and coding a second portion of coding units in the tile of video data substantially in parallel with coding the first portion of coding units. Coding the first portion and the second portion of coding units includes intra-prediction coding. The intra-prediction coding uses no intra-prediction dependency between a portion of one coding unit in the first portion of coding units and at least one adjacent coding unit in the second portion of coding units.

Likewise, video decoder 30 may be configured to perform a method of coding video that includes coding a first portion of coding units in a tile of video data, and coding a second portion of coding units in the tile of video data substantially in parallel with coding the first portion of coding units. Coding the first portion and the second portion of coding units includes intra-prediction coding. The intra-prediction coding uses no intra-prediction dependency between a portion of one coding unit in the first portion of coding units and at least one adjacent coding unit in the second portion of coding units.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. The following section will discuss certain aspects of the HM in more detail.

For video coding according to the HEVC standard currently under development, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU, depending on context. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a CU or PU identified by a coding node. In some specific cases, this disclosure may also use the term "video block" generically to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, differences between the pixels in the original video data block and the pixels in its predictive block is determined. This difference may be referred to as the prediction residual data, and indicates the pixel differences between the pixel values, e.g., luma and/or chroma value differences, in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

Figure 2:
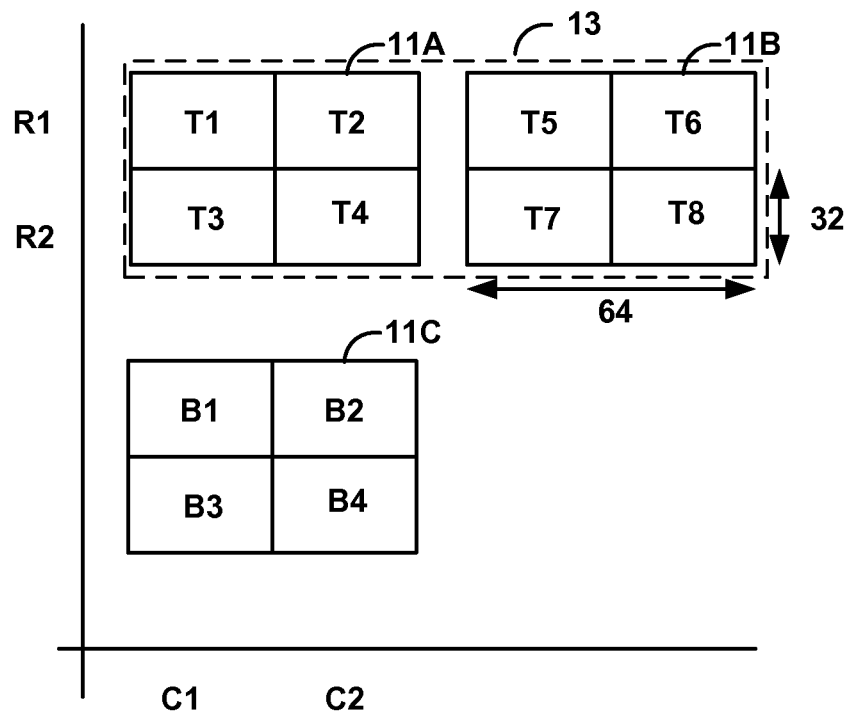
FIG. 2 is a block diagram illustrating examples of blocks of video data in a tile.

FIG. 2 is a block diagram illustrating examples of blocks that each includes units of video data. For example, FIG. 2 illustrates block 11A, block 11B, and block 11C (collectively referred to as "blocks 11"). In some examples, each one of blocks 11 may be considered as an LCU. An LCU is a portion of a picture, and may be a 64×64 block of pixels of a picture; although such an example size of the LCU is provided for purposes of illustration and should not be considered limiting. Also, FIG. 2 illustrates a gap between blocks 11. This gap is provided for ease of illustration only. In some examples, blocks 11 are neighboring blocks within the picture, such that there is no gap between blocks 11 within the picture.

In one proposal for HEVC, the LCU size can be as large as 64×64, and a TU (e.g., a TU within an LCU) can be as large as 32×32. As illustrated in FIG. 2, block 11A includes units T1-T4, block 11B includes units T5-T8, and block 11C includes units B1-B4. In the example of FIG. 2, each one of these units may be a 32×32 block of pixels (e.g. a 32×32 CU), as one example. Hence, each one of blocks 11 includes four of such units. In some examples, these units (e.g., T1-T8 and B1-B4) may be PUs and/or TUs.

In the example of FIG. 2, blocks 11A and 11B form one tile 13. Block 11C forms part of another tile. Tiles are a function of a syntax currently defined in the HEVC working draft, e.g., as described in B. Bross, W.-J. Han, J.-R. Ohm, G. J. Sullivan, T. Wiegand, "WD5: Working Draft 5 of High-Efficiency Video Coding," 7$^{th}$ JCT-VC Meeting, Geneva, CH, November 2011, Doc. JCT-VC G1103_d3, specifying a rectangular region. Within a tile area, LCUs are coded one by one according to raster scan order. The example of FIG. 2 shows horizontally-oriented tiles. It should be noted that vertically-oriented tiles are also possible. For example, whereas as tile consisting of blocks 11A and 11B would form a horizontally-oriented tile, a tile consisting of blocks 11A and 11C would form a vertically-oriented tile.

Each one of the units T1-T8 and B1-B4 may be intra-predicted or inter-predicted. Intra-prediction refers to predicting a unit based on one or more other units within the same picture. Inter-prediction refers to predicting a unit based on one or more other units within one or more different pictures. For example, it may be possible that unit T5 is intra-predicted from unit T4.

Before decoding PUs within each of the LCUs using intra-prediction, it may be necessary to wait until PUs within neighboring LCUs are decoded. This is because PUs in neighboring LCUs may be used as predictors for PUs in the current LCU. As such, it is typically necessary for LCU's above, to the upper left, to the left, and to the lower left of the current LCU to be decoded before decoding the current LCU using intra-prediction. This situation is sometimes called intra-prediction dependency.

Figure 3:
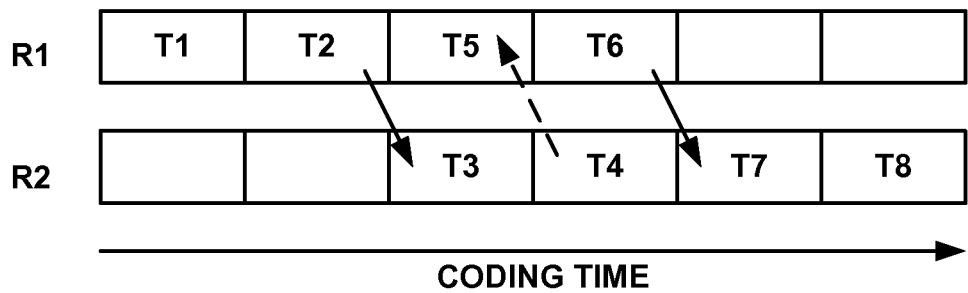
FIG. 3 is a block diagram illustrating an example parallel coding structure.

To increase the speed of decoding, it is preferable to decode rows (or columns in the case of vertically-oriented tiles) of LCUs in a tile in parallel. For example, as shown in FIG. 3, it would be preferable to decode the row including T1, T2, T5 and T6, substantially in parallel with the row including T3, T4, T7 and T7. Note that decoding of T3 would not begin until both T1 and T2 are decoded, as PUs within T3 may require PUs in T1 and T2 to be decoded before T3 can be decoded using intra prediction. However, because of intra-prediction dependency, decoding of unit T5 using intra-prediction also cannot be performed until LCU T4 has been decoded.

Because of intra-prediction dependency, it may be difficult or impossible to perform intra prediction of T5 (FIG. 2) until intra prediction of T4 is complete. This may prevent parallel coding (e.g., decoding or encoding) of top-half and bottom-half of 64 pixel high LCU rows because of the impossible to meet intra-prediction dependency.

For example, in FIG. 2, row R1 includes contiguous units T1, T2, T5, and T6, which are of different blocks, and row R2 includes contiguous units T3, T4, T7, and T8, which are also of different blocks. In this case, if T5 is intra-predicted from T4, it may be difficult to code (e.g., encode or decode) the units in row R1 in parallel with the units in row R2 because T5 may not be able to be coded until T4 is coded. That is, the information from T4 must be available in order use T4 for intra-prediction of T5.

FIG. 3 illustrates this intra-coding dependency with arrows. FIG. 3 is a block diagram illustrating an example where units of different blocks that are on different rows may not be able to be coded in parallel. In the example of FIG. 3, unit T3 is intra-predicted from unit T2 (as illustrated by the arrow from T2 to T3), and therefore, the parallel coding of units in row R2 is delayed until unit T2 in row R1 is coded. However, in the example of FIG. 3, unit T5 is intra-predicted from unit T4 (as illustrated by the dashed arrow from T4 to T5). In this example, when it is time for T5 to be coded, T4 would not have been coded. Accordingly, it may be difficult or impossible to code units of different blocks that reside in a first row (e.g., units T1, T2, T5, and T6 on row R1) in parallel with units of the different blocks that reside in a second row (e.g., units T3, T4, T7, and T8 on row R2). This may especially be the case where adjacent units are located in different LCUs (e.g., unit T5 in block 11B and unit T4 in block 11A).

Figure 4:
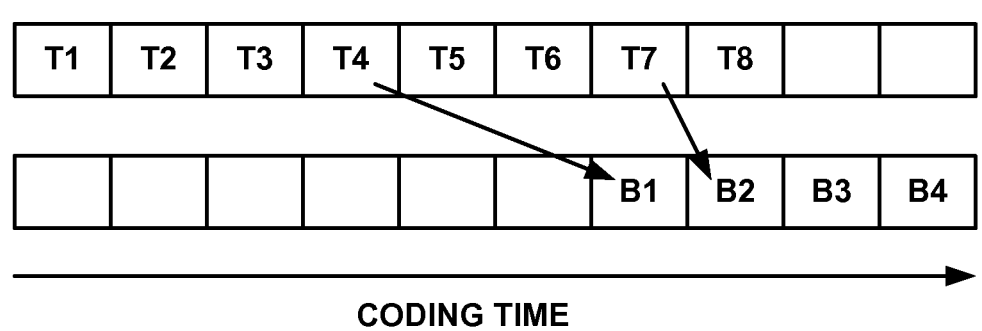
FIG. 4 is a block diagram illustrating another example parallel coding structure.

This situation may force parallel decoding to a coarser level of granularity (two parallel decoders working on different LCU rows). In particular, FIG. 4 shows one possible scheduling. FIG. 4 is a block diagram illustrating an example where different blocks that are on different rows are coded in parallel. Similar to FIG. 3, the arrows in FIG. 4 illustrate which unit is used to inter-predict the current unit. For example, unit B1 is intra-predicted from unit T4, and unit B2 is intra-predicted from unit T7. In the example of FIG. 4, units of blocks 11A and 11B are coded, and in parallel (after a substantial delay), the units of block 11C are coded. The granularity of the technique of FIG. 4 are coarser because it requires coding of entire blocks that reside on different rows in parallel, rather than a finer granularity sub-level (e.g., sub-LCU level) parallel coding scheme of different rows of units within the blocks.

An alternative technique for parallel coding, relative to the example of FIG. 4, could be coding LCUs as basic processing units with LCU delay between consecutive parallel decoders. These techniques for parallel coding suffer from the disadvantage of larger horizontal as well as vertical distances between in-flight processing units and its attendant disadvantage of inefficient cache usage resulting from reduced locality of references, especially when fetching parts of reference frame (e.g., picture) for motion compensation.

In view of the above-discussed disadvantages, this disclosure presents techniques for parallel coding of video data (e.g., video blocks) that resides on different rows or columns. In one example of the disclosure, different rows or columns of video blocks within a tile containing multiple LCUs may be coded in parallel. As such, example techniques of this disclosure may be considered as sub-LCU level parallel coding (e.g., encoding or decoding). For instance, the parallel coding may be performed across rows or columns within LCUs (e.g., at a sub-LCU level), rather than across different LCUs.

According to one example, this disclosure proposes techniques that allow for the parallel coding structure illustrated in FIG. 3, without the problems described above related to intra-prediction dependency. Furthermore, because these techniques apply to a finer granular scheme (i.e., blocks in rows or columns may be coded in parallel more closely in time with less delay) compared to that discussed above with respect to FIG. 4 and its alternative schemes, the techniques of this disclosure may not suffer from the disadvantages related to inefficient cache usage.

In one example, this disclosure proposes to enable finer grained parallelism (e.g., the parallelism of FIG. 3) by removing an intra-prediction dependency between at least a portion of a block of video data (e.g., a prediction unit) in a first row or column and a block of video data in a second row or column. In effect, removing the intra-prediction dependency involves performing intra-prediction coding (i.e., both encoding and decoding) without using a first block of video data as a predictor for another, second block when the first, predictor block would be unavailable at the time the second block is to be coded based on the parallel coding structure. As one example, referring to FIG. 3, intra-prediction coding of unit T5 would be performed without the use of any predictor blocks in unit T4. As such, the parallel coding structure of FIG. 3 would not encounter any problems with intra-prediction dependency as the problematic dependencies (e.g., unit T5 depending on unit T4) have been removed.

In a more specific example, this disclosure proposes to remove one or more intra-prediction dependencies based on the coding order of 32×32 sub-LCU blocks in a tile (e.g., as shown in FIG. 3). For example, when the sub-LCU block decoding order is a horizontal scan, the intra-prediction dependency from T4 to T5 (dashed arrow in FIG. 3) is removed. In particular, while performing intra-prediction for T5, pixels belonging to T4 are marked (either through signaling from video encoder 20 or by video decoder 30) as unavailable for intra-prediction, and corresponding locations in the intra-prediction context are filled using padding. In other examples, it may be implicitly signaled that T4 is unavailable for intra-predicting T5. That is, in all situations where T4 is positioned to the lower left of T5, and T4 is in a different LCU (e.g., when performing a horizontal raster scan), both video encoder 20 and video decoder 30 may utilize predetermined rules, without an explicit signal, to determine that T4 is unavailable.

In other words, the techniques of this disclosure may include a method comprising coding a first plurality of coding units in a tile of video data (e.g., sub-LCU units T1, T2, T5 and T6 in row 1 of FIG. 2). The method may further include coding a second plurality of coding units in the tile of video data (e.g., sub-LUC units T3, T4, T7 and T8 in row 2 of FIG. 2) substantially in parallel with coding the first plurality of coding units. In this context, "substantially in parallel" means that coding the second plurality of coding units is performed after at least one coding unit in the first plurality of coding units is coded. In the example of FIG. 3, two coding unit (T1 and T2) are coded before starting coding on the second row. In other examples of the disclosure, discussed in more detail below, only one coding unit need be coded in the first row before beginning parallel coding the second row.

In one example of the disclosure, coding the first plurality and the second plurality of coding units includes intra-prediction coding. In this example, intra-prediction coding is performed using no intra-prediction dependency between a portion of one coding unit in the first plurality of coding units (e.g., T5) and at least one adjacent coding unit in the second plurality of coding units (e.g., T4).

When pixels are marked as unavailable for intra-prediction coding, video encoder 20 and video decoder 30 may determine padding values for the pixels marked as unavailable. It some examples, it may be possible to perform intra-prediction using these padded values. For instance, when the pixels located in T4 are marked as unavailable for intra-prediction for unit T5, video encoder 20 and video decoder 30 may determine padding values for these pixels, and then use the padding values for intra-prediction if a selected intra-prediction mode requires the use of pixels in the unavailable block (e.g., T4). There may be different techniques for determining the padding values, and aspects of this disclosure are not limited to any particular technique. For example, the technique to determine the padding values may be a default technique.

Figure 5:
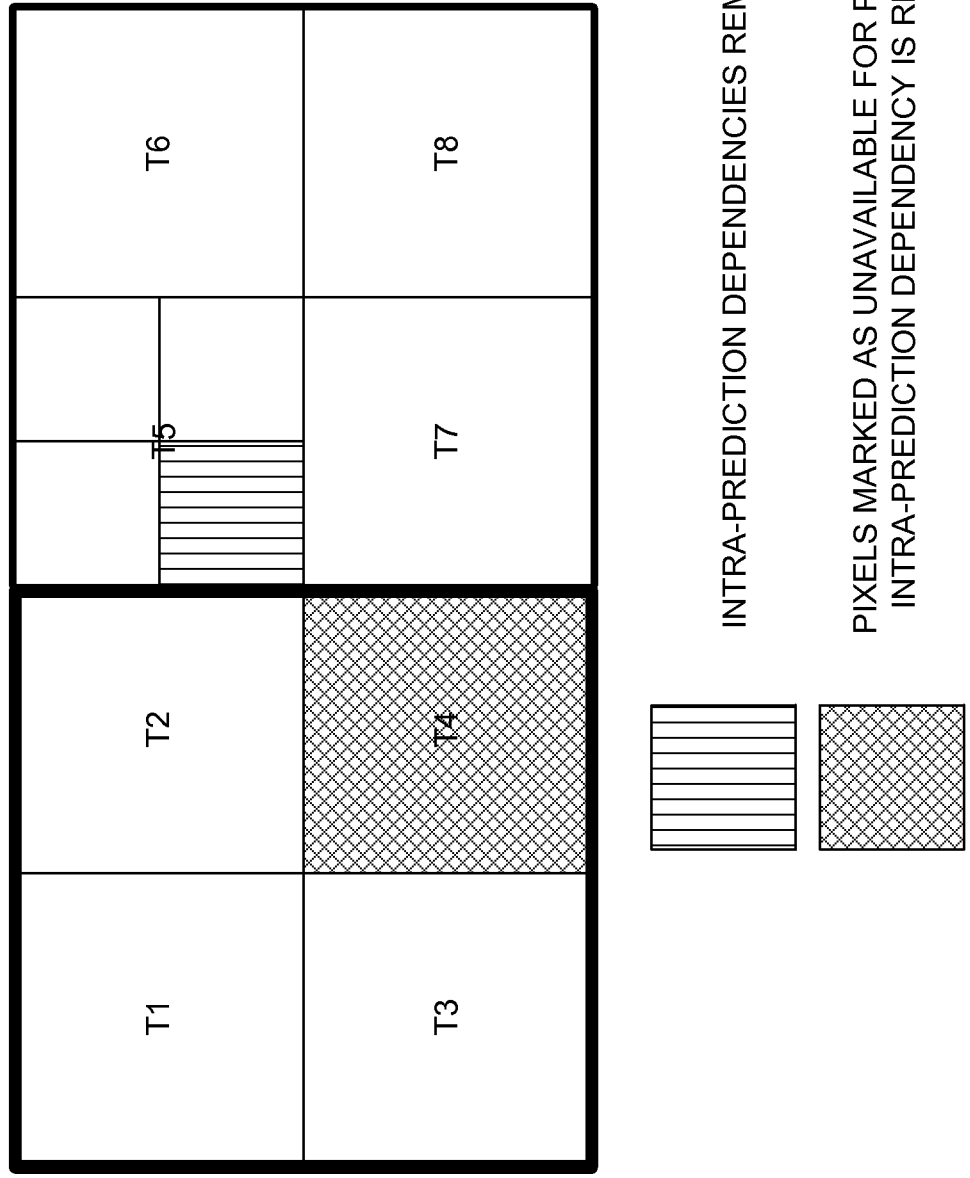
FIG. 5 is a conceptual diagram illustrating a removed intra-prediction dependency for a lower left corner of a video block.

In another example of the disclosure, the intra-prediction dependency to an adjacent block (e.g., T4) is removed for only a portion of another block (e.g., only the bottom left corner PU/TU of unit T5). This more limited restriction is possible because, for decoding with a horizontal raster scan of tiles, only the bottom left corner of the upper sub-LCU row of blocks in one LCU would use pixels from another LCU for intra-prediction. FIG. 5 shows an example of this scenario. As shown in FIG. 5, the TU/PU in the lower left corner of unit T5 is coded using intra-prediction without the use of any intra-prediction dependencies on unit T4. Note that, for intra-prediction, the PU and the TU are of the same size in some examples. The pixels in T4 are marked as unavailable for the marked PU in T5. Instead, T5 would use any other causal video block or the padding values for performing intra-prediction (e.g., T2). Note that the other PUs in T5 (i.e., the unmarked TUs) would not typically utilize pixels in T4 for intra-prediction. As shown in FIG. 5, the PU/TU marked as unavailable is a 16×16 PU/TU. Other PU/TU sizes could be used, including 32×32, 8×8, 4×4, and other non-square PU/TU sizes. In the case of a 32×32 TU, the bottom left TU of T5 would span the whole of T5. As such, in a 64×64 LCU, the removal of intra-prediction dependencies to a block in a neighboring LCU only affects one PU/TU at the lower left corner of the block.

For a vertical scan, intra-prediction dependencies would be removed for the upper right PU/TU of a sub-LCU block. For example, referring back to FIG. 2, when coding the column C1, including units T1, T3, B1 and B3, the upper right PU/TU of unit B1 would be coded using intra-prediction by removing any intra-prediction dependencies from pixels in unit T4. Pixels in T4 would be marked as unavailable for use in intra-prediction for the upper right PU/TU of unit B1. Instead, B1 would use any other causal video block or the padding values for performing intra-prediction (e.g., T3).

In general, by marking the pixels of T4 as unavailable, the techniques of this disclosure may allow for parallel coding of the T1, T2, T5, and T6 units in the first row and T3, T4, T7, and T8 units in the second row because the dependency of T5 upon T4 is removed. Again, it should be noted that although T4 is unavailable for intra-predicting T5, it may be possible to intra-predict T5 with the padding values used in place of the actual pixel values of T4. In this case, the proposed techniques of this disclosure may not include accessing the actual pixel values of T4, which may not be available due to parallel processing, but rather include determining the padding pixel values without any information regarding the pixel values of T4 and then intra-predicting pixels in T5 based on the padding pixel values.

Benefits from the proposed techniques of this disclosure may include more efficient cache usage resulting from improved locality of reference, especially when fetching parts of reference frame (e.g., picture) for motion compensation. Further dependency breaking can enable even finer grained parallelism, e.g., 4× parallelism within a 64 pixel high LCU row, by breaking similar dependencies across four horizontal rows defined by horizontal lines separating 16 pixel high horizontal strips. A largest TU size of 32 in the current working draft of HEVC becomes a gating factor in such parallelism, possibly limiting the benefits.

FIG. 6 shows a scheduling for 4× parallel encoding/decoding (2× per LCU row) using the aforementioned techniques. The scheduling shown in FIG. 6 has a delay of 3 LCUs for the $4^{th}$ half-LCU row (B3 and B4) before coding commences. This delay is provided to ensure availability of causal neighbor blocks for intra-coding, and can be further reduced using additional intra-prediction dependency breaking. By breaking the dependency between T2 and T3 (and corresponding dependencies within all LCUs), the delay of 3 LCUs can be reduced to 2 LCUs, as shown in FIG. 7. Furthermore, by breaking the dependencies between T4 and B1 and between T7 and B2 (and corresponding dependencies in all LCUs), the delay can be further reduced to 1.5 LCUs, as shown in FIG. 8. Such delay reductions can further contribute to more efficient cache use.

By minimizing the amount of dependency breaking to enable a desired level of parallelism, the techniques described in this disclosure may minimize the coding loss for a given level of parallelism. When LCU coding order is vertical scan, similar ideas of this disclosure can also be applied, with certain modifications in breaking intra-prediction dependency. For example, parallel decoding could be performed as follows:

T1, T3, B1, B3
T2, T4, B2, B4

In this example, video encoder 20 and/or video decoder 30 would start the coding of T2 start after the coding of T1, and in parallel with the coding of T3. As can be seen from FIG. 2, T1, T3, B1, and B3 reside along the same column (C1) and belong to different blocks (e.g., blocks 11A and 11C). Also, as can be seen from FIGS. 2, T2, T4, B2, and B4 reside along the same column (C2) and belong to different blocks (e.g., blocks 11A and 11C).

In this case, intra prediction of T3 cannot be dependent on T2, so such dependency from T3 to T2 should be removed (e.g., by video encoder 20 and/or video decoder 30 marking T2 as unavailable). Pixels of T2 that may be used for intra prediction of T3 should be assumed unavailable and filled using padding, e.g., by video encoder 20 and/or video decoder 30. Similarly, such dependency should also be removed from B1 to T4, and from B3 to B2, and so on.

Currently, in HEVC, if a tile area has a width of one LCU and a height of a number of LCUs, the LCU scan order can be essentially considered as a vertical raster scan order. For example, according to FIG. 2, a tile area may contain T1, T2, T3, T4 and B1, B2, B3 B4. Accordingly, the techniques described in this disclosure may be configured for a horizontal raster scan order or vertical raster scan order.

Figure 9:
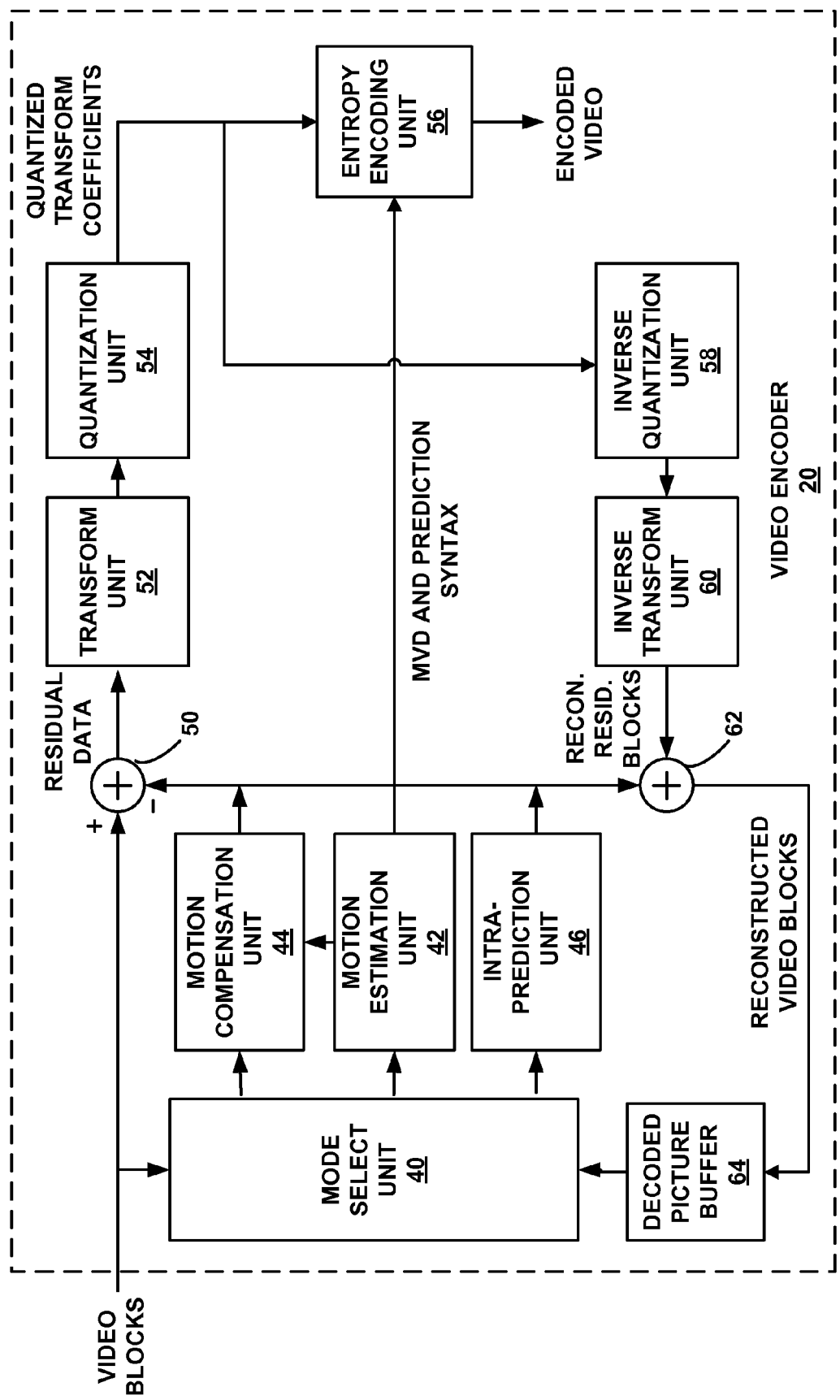
FIG. 9 is a block diagram illustrating an example of a video encoder that may use techniques for parallel coding.

FIG. 9 is a block diagram illustrating an example of a video encoder 20 that may use the techniques of this disclosure for removing intra-prediction dependencies to support parallel video decoding and/or decoding. The video encoder 20 will be described in the context of HEVC coding for purposes of illustration, but without limitation of this disclosure as to other coding standards or methods. The video encoder 20 may perform intra- and inter-coding of CUs within video pictures. Intra-coding relies on spatial prediction to reduce or remove spatial redundancy in video data within a given video picture. Inter-coding relies on temporal prediction to reduce or remove temporal redundancy between a current picture and previously coded pictures of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 9, the video encoder 20 receives a current video block within a video picture to be encoded. In the example of FIG. 9, the video encoder 20 includes a motion compensation unit 44, a motion estimation unit 42, an intra-prediction unit 46, a decoded picture buffer 64, a summer 50, a transform unit 52, a quantization unit 54, and an entropy encoding unit 56. The transform unit 52 illustrated in FIG. 9 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform unit 60, and a summer 62. A deblocking filter (not shown in FIG. 9) may also be included to filter block boundaries to remove blockiness artifacts from reconstructed video. If desired, the deblocking filter would typically filter the output of the summer 62.

During the encoding process, the video encoder 20 receives a video picture or slice to be coded. The picture or slice may be divided into multiple video blocks, e.g., largest coding units (LCUs). The motion estimation unit 42 and the motion compensation unit 44 perform inter-predictive coding of the received video block relative to one or more blocks in one or more reference pictures to provide temporal compression. The intra-prediction unit 46 may perform intra-predictive coding of the received video block relative to one or more neighboring blocks in the same picture or slice as the block to be coded to provide spatial compression.

For example, intra-prediction unit 46 may be configured to or operable to perform the techniques of this disclosure. For instance, referring back to FIG. 2, intra-prediction unit 46 may indicate (e.g., through signaling in an encoded video bitstream) that T4 is unavailable for intra-predicting T5. In other examples, it may be implicitly signaled that T4 is unavailable for intra-predicting T5. That is, in all situations where T4 is positioned to the lower left of T5, and T4 is in a different LCU (e.g., when performing a horizontal raster scan), both video encoder 20 and video decoder 30 may utilize predetermined rules, without an explicit signal, to determine that T4 is unavailable. In this way, it may be possible for intra-prediction unit 46 to code the TUs that reside along row R1 in parallel with the TUs that reside along row R2. In alternate examples, a unit other than intra-prediction unit 46 (e.g., a processor) may be configured to or operable to implement the parallel coding schemed described above. In some examples, the parallel coding scheme may be performed by one or more intra-prediction units 46, or shared among different units or modules of video encoder 20. It should be noted that video encoder 20 need not perform parallel encoding to support parallel decoding, but rather, only needs to perform intra-prediction with the removed intra-prediction dependencies to support parallel decoding.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference picture. Summer 62 combines the predicted block with inverse quantized, inverse transformed data from inverse transform unit 60 for the block to reconstruct the encoded block, as described in greater detail below. Some video pictures may be designated as I-pictures, where all blocks in an I-picture are encoded in an intra-prediction mode. In some cases, the intra-prediction unit 46 may perform intra-prediction encoding of a block in a P- or B-picture, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current picture relative to a reference sample of a reference picture. The motion estimation unit 42 calculates a motion vector for a prediction unit of an inter-coded picture by comparing the prediction unit to reference samples of a reference picture stored in the decoded picture buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference picture or reference slice, and not necessarily at a block (e.g., coding unit) boundary of the reference picture or slice. In some examples, the reference sample may occur at a fractional pixel position.

The motion estimation unit 42 sends the calculated motion vector to the entropy encoding unit 56 and the motion compensation unit 44. The portion of the reference picture identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-four directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 selects a transform from among a plurality of transforms. The transform may be selected based on one or more coding characteristics, such as block size, coding mode, or the like. The transform unit 52 then applies the selected transform to the TU, producing a video block comprising a two-dimensional array of transform coefficients.

The transform unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), Probability Interval Partitioning Entropy (PIPE), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the pictures of the decoded picture buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the decoded picture buffer 64. The reconstructed video block may be used by the motion estimation unit 42 and the motion compensation unit 44 as a reference block to inter-code a block in a subsequent video picture.

In accordance with the techniques of this disclosure, video encoder 20 may be configured to code a first plurality of coding units in a tile of video data, and code a second plurality of coding units in the tile of video data substantially in parallel with coding the first plurality of coding units. Coding the first plurality and the second plurality of coding units includes intra-prediction coding. In one example of the disclosure, intra-prediction coding uses no intra-prediction dependency between a portion of one coding unit in the first plurality of coding units and at least one adjacent coding unit in the second plurality of coding units.

Figure 10:
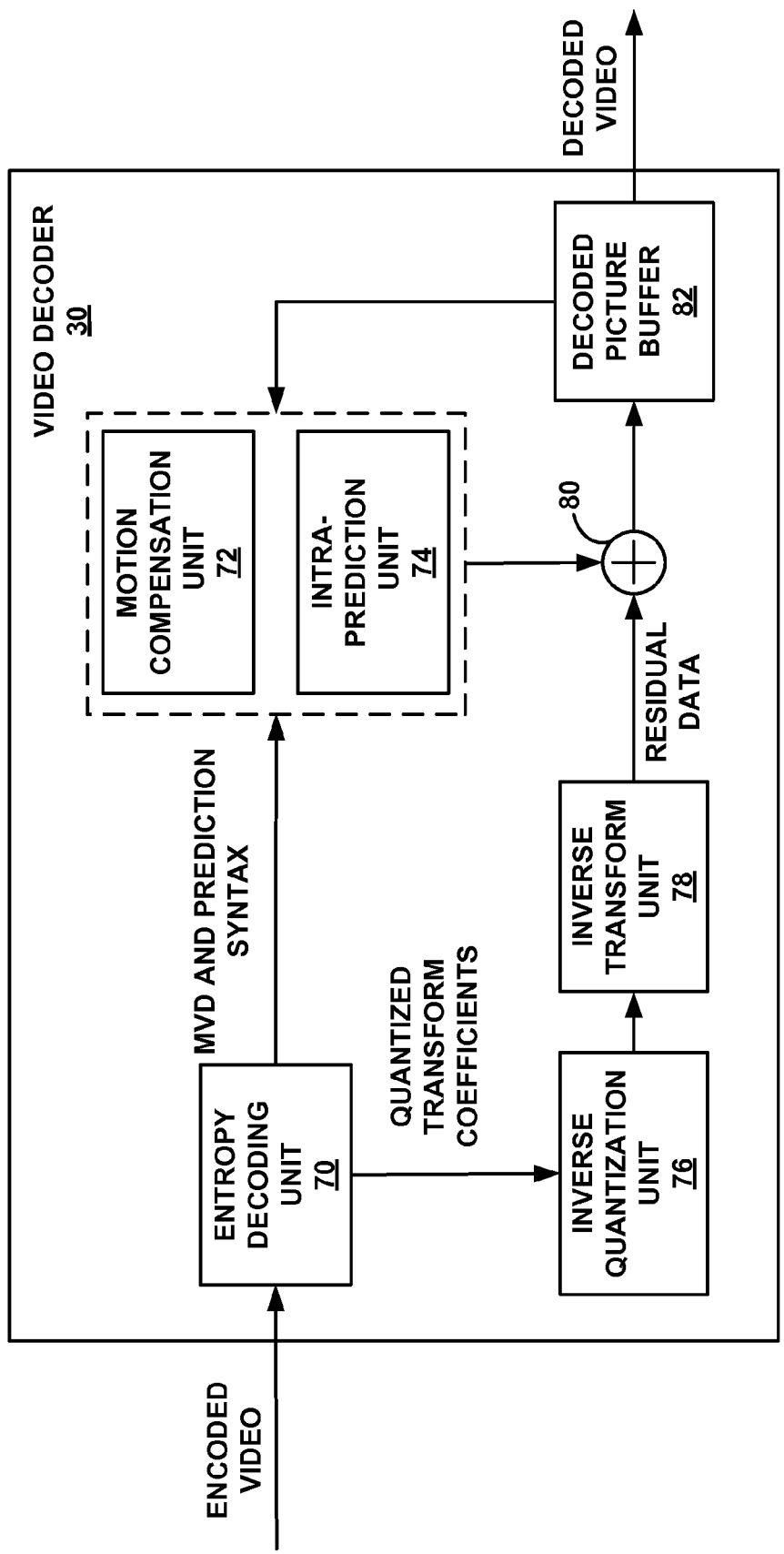
FIG. 10 is a block diagram illustrating an example of a video decoder that may use techniques for parallel coding.

FIG. 10 is a block diagram illustrating an example of a video decoder 30 that may use the techniques of this disclosure for parallel coding. In the example of FIG. 10, the video decoder 30 includes an entropy decoding unit 70, a motion compensation unit 72, an intra-prediction unit 74, an inverse quantization unit 76, an inverse transformation unit 78, a decoded picture buffer 82 and a summer 80. The video decoder 30 may, in some examples, perform a decoding pass generally reciprocal to the encoding pass described with respect to the video encoder 20 (see FIG. 9).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 78 applies an inverse transform to the inverse quantized transform coefficients. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms to the transform coefficients of the current block being decoded.

The intra-prediction unit 74 may generate prediction data for a current block of a current picture based on a signaled intra-prediction mode and data from previously decoded blocks of the current picture. In some instances, intra-prediction unit 74 may be configured or operable to perform the techniques of this disclosure. For instance, referring back to FIG. 2, intra-prediction unit 74 may determine that T4 is unavailable for intra-predicting T5. In this way, it may be possible for intra-prediction unit 74 to code the TUs that reside along row R1 in parallel with the TUs that reside along row R2. In alternate examples, a unit other than intra-prediction unit 74 (e.g., a processor) may be configured or operable to implement the parallel coding schemed described above. In some examples, the parallel coding scheme may be performed by one or more intra-prediction units 74, or shared among different units or modules of video decoder 30.

The motion compensation unit 72 may retrieve the motion vector, motion prediction direction and reference index from the encoded bitstream. The reference prediction direction indicates whether the inter-prediction mode is uni-directional (e.g., a P picture) or bi-directional (a B picture). The reference index indicates which reference picture the candidate motion vector is based on.

Based on the retrieved motion prediction direction, reference picture index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode picture(s) of the encoded video sequence. The motion compensation unit 72 and the intra-prediction unit 74 may also use syntax information to determine split information that describes how each CU of a picture of the encoded video sequence is split (and likewise, how sub-CUs are split). The syntax information may also include modes indicating how each split is encoded (e.g., intra- or inter-prediction, and for intra-prediction an intra-prediction encoding mode), one or more reference pictures (and/or reference lists containing identifiers for the reference pictures) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. If desired, a deblocking filter may also be applied to filter the decoded blocks in order to remove blockiness artifacts. The decoded video blocks are then stored in the decoded picture buffer 82, which provides reference blocks for subsequent motion compensation and also produces decoded video for presentation on a display device (such as the display device 32 of FIG. 4).

In accordance with the techniques of this disclosure, video decoder 30 may be configured to code a first plurality of coding units in a tile of video data, and code a second plurality of coding units in the tile of video data substantially in parallel with coding the first plurality of coding units. Coding the first plurality and the second plurality of coding units includes intra-prediction coding. In one example of the disclosure, intra-prediction coding uses no intra-prediction dependency between a portion of one coding unit in the first plurality of coding units and at least one adjacent coding unit in the second plurality of coding units.

Figure 11:
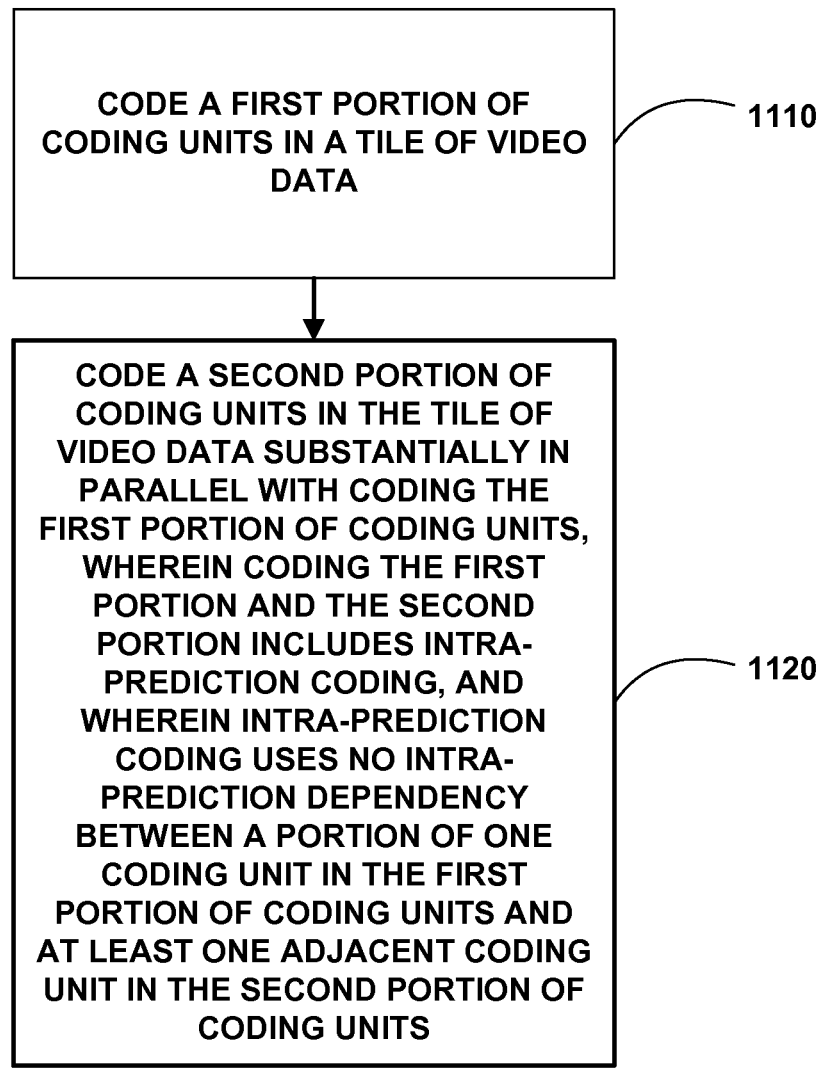
FIG. 11 is a flowchart depicting an example method according to the techniques of this disclosure.

FIG. 11 is a flowchart depicting an example coding process according to the techniques of this disclosure. The method of FIG. 11 may be executed by video encoder 20 or video decoder 30.

Video encoder 20 and video decoder 30 may be configured to perform a method of coding video that includes coding a first portion of coding units in a tile of video data (1110), and coding a second portion of coding units in the tile of video data substantially in parallel with coding the first portion of coding units (1120). Coding the first portion and the second portion of coding units includes intra-prediction coding. The intra-prediction coding uses no intra-prediction dependency between a portion of one coding unit in the first portion of coding units and at least one adjacent coding unit in the second portion of coding units.

In one example of the method, the portion of the one coding unit in the first portion of coding units is in a first largest coding unit (LCU), and the at least one adjacent coding unit in the second portion coding units is in a second largest coding unit (LCU).

In one example of the method, coding the first portion of coding units and the second portion of coding units comprises coding the first portion of coding units and the second portion of coding units in a horizontal raster scan order. The first portion of coding units in the tile is a first row of coding units in the tile, and the second portion of coding units in the tile is a second row of coding units in the tile. In a further example, the portion of the one coding unit in the first portion of coding units is a transform unit located in the lower left corner of the one coding unit.

In another example of the method, coding the first portion of coding units and the second portion of coding units comprises coding the first portion of coding units and the second portion of coding units in a vertical raster scan order. The first portion of coding units in the tile is a first column of coding units in the tile, and the second portion of coding units in the tile is a second column of coding units in the tile. In a further example, the portion of the one coding unit in the first portion of coding units is a transform unit located in the upper right corner of the one coding unit.

In another example of the method, coding the second portion of coding units in the tile of video data substantially in parallel with coding the first portion of coding units in the tile of video data comprises coding the second portion of coding units after at least one coding unit in the first portion of coding units is coded.

In another example of the method, coding the first portion of coding units and coding the second portion of coding units comprises encoding the first portion of coding units and encoding the second portion of coding units. In this example, video encoder 20 may be further configured to signal an indication that the at least one adjacent coding unit in the second portion of coding units is unavailable for use in intra-prediction coding of the portion of one coding unit in the first portion of coding units, and determine padding values for pixels located in the second portion of coding units indicated as unavailable for use in intra-prediction coding.

In another example of the method, coding the first portion of coding units and coding the second portion of coding units comprises decoding the first portion of coding units and decoding the second portion of coding units. In this example, video decoder 30 may be further configured to receive an indication that the at least one adjacent coding unit in the second portion of coding units is unavailable for use in intra-prediction coding of the portion of one coding unit in the first portion of coding units, and determine padding values for pixels located in the second portion of coding units indicated as unavailable for use in intra-prediction coding.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data, the method comprising:
    determining, for a first plurality of coding units, that at least one adjacent coding unit in a second plurality of coding units is unavailable for use in intra-prediction coding of a portion of one coding unit in the first plurality of coding units;
    determining padding values for pixels located in the second plurality of coding units determined as unavailable for use in intra-prediction coding;
    coding the first plurality of coding units in a tile of the video data; and
    coding the second plurality of coding units in the tile of the video data after at least one coding unit in the first plurality of coding units is coded, such that coding the second plurality of coding units occurs substantially in parallel with coding the first plurality of coding units, wherein coding the first plurality and the second plurality of coding units includes intra-prediction coding, and wherein the intra-prediction coding uses the determined padding values for pixels located in the second plurality of coding units determined as unavailable for use in intra-prediction coding.

2. The method of claim 1, wherein the portion of the one coding unit in the first plurality of coding units is in a first largest coding unit (LCU), and wherein the at least one adjacent coding unit in the second plurality of coding units is in a second largest coding unit (LCU).

3. The method of claim 1, wherein the first plurality of coding units in the tile is a first row of coding units in the tile, and wherein the second plurality of coding units in the tile is a second row of coding units in the tile.

4. The method of claim 3, wherein the portion of the one coding unit in the first plurality of coding units is a transform unit located in the lower left corner of the one coding unit.

5. The method of claim 1, wherein the first plurality of coding units in the tile is a first column of coding units in the tile, and wherein the second plurality of coding units in the tile is a second column of coding units in the tile.

6. The method of claim 5, wherein the portion of the one coding unit in the first plurality of coding units is a transform unit located in the upper right corner of the one coding unit.

7. The method of claim 1, wherein coding the first plurality of coding units and coding the second plurality of coding units comprises encoding the first plurality of coding units and encoding the second plurality of coding units, the method further comprising:
    signaling an indication that the at least one adjacent coding unit in the second plurality of coding units is unavailable for use in intra-prediction coding of the portion of one coding unit in the first plurality of coding units.

8. The method of claim 1, wherein coding the first plurality of coding units and coding the second plurality of coding units comprises decoding the first plurality of coding units and decoding the second plurality of coding units, the method further comprising:
    receiving an indication that the at least one adjacent coding unit in the second plurality of coding units is unavailable for use in intra-prediction coding of the portion of one coding unit in the first plurality of coding units.

9. An apparatus configured to code video data, the apparatus comprising:
    a memory configured to store the video data; and
    a video coder configured to:
        determine, for a first plurality of coding units, that at least one adjacent coding unit in a second plurality of coding units is unavailable for use in intra-prediction coding of a portion of one coding unit in the first plurality of coding units;
        determine padding values for pixels located in the second plurality of coding units determined as unavailable for use in intra-prediction coding;
    code a first plurality of coding units in a tile of the video data; and
    code a second plurality of coding units in the tile of the video data after at least one coding unit in the first plurality of coding units is coded, such that coding the second plurality of coding units occurs substantially in parallel with coding the first plurality of coding units, wherein coding the first plurality and the second plurality of coding units includes intra-prediction coding, and wherein the intra-prediction coding uses the determined padding values for pixels located in the second plurality of coding units determined as unavailable for use in intra-prediction coding.

10. The apparatus of claim 9, wherein the portion of the one coding unit in the first plurality of coding units is in a first largest coding unit (LCU), and wherein the at least one adjacent coding unit in the second plurality of coding units is in a second largest coding unit (LCU).

11. The apparatus of claim 9, wherein the first plurality of coding units in the tile is a first row of coding units in the tile, and wherein the second plurality of coding units in the tile is a second row of coding units in the tile.

12. The apparatus of claim 11, wherein the portion of the one coding unit in the first plurality of coding units is a transform unit located in the lower left corner of the one coding unit.

13. The apparatus of claim 9, wherein the first plurality of coding units in the tile is a first column of coding units in the tile, and wherein the second plurality of coding units in the tile is a second column of coding units in the tile.

14. The apparatus of claim 13, wherein the portion of the one coding unit in the first plurality of coding units is a transform unit located in the upper right corner of the one coding unit.

15. The apparatus of claim 9, wherein the video coder is a video encoder, the video encoder further configured to:
    signal an indication that the at least one adjacent coding unit in the second plurality of coding units is unavailable for use in intra-prediction coding of the portion of one coding unit in the first plurality of coding units.

16. The apparatus of claim 9, wherein the video coder is a video decoder, the video decoder further configured to:
    receive an indication that the at least one adjacent coding unit in the second plurality of coding units is unavailable for use in intra-prediction coding of the portion of one coding unit in the first plurality of coding units.

17. An apparatus configured to code video data, the apparatus comprising:
    means for determining, for a first plurality of coding units, that at least one adjacent coding unit in a second plurality of coding units is unavailable for use in intra-prediction coding of a portion of one coding unit in the first plurality of coding units;
    means for determining padding values for pixels located in the second plurality of coding units determined as unavailable for use in intra-prediction coding;
    means for coding a first plurality of coding units in a tile of the video data; and
    means for coding a second plurality of coding units in the tile of the video data after at least one coding unit in the first plurality of coding units is coded, such that coding the second plurality of coding units occurs substantially in parallel with coding the first plurality of coding units,
    wherein coding the first plurality and the second plurality of coding units includes intra-prediction coding, and wherein the intra-prediction coding uses the determined padding values for pixels located in the second plurality of coding units determined as unavailable for use in intra-prediction coding.

18. The apparatus of claim 17, wherein the portion of the one coding unit in the first plurality of coding units is in a first largest coding unit (LCU), and wherein the at least one adjacent coding unit in the second plurality of coding units is in a second largest coding unit (LCU).

19. The apparatus of claim 17, wherein the first plurality of coding units in the tile is a first row of coding units in the tile, and wherein the second plurality of coding units in the tile is a second row of coding units in the tile.

20. The apparatus of claim 19, wherein the portion of the one coding unit in the first plurality of coding units is a transform unit located in the lower left corner of the one coding unit.

21. The apparatus of claim 17, wherein the first plurality of coding units in the tile is a first column of coding units in the tile, and wherein the second plurality of coding units in the tile is a second column of coding units in the tile.

22. The apparatus of claim 21, wherein the portion of the one coding unit in the first plurality of coding units is a transform unit located in the upper right corner of the one coding unit.

23. The apparatus of claim 17, wherein the means for coding the first plurality of coding units and coding the second plurality of coding units comprises means for encoding the first plurality of coding units and encoding the second plurality of coding units, the apparatus further comprising:
    means for signaling an indication that the at least one adjacent coding unit in the second plurality of coding units is unavailable for use in intra-prediction coding of the portion of one coding unit in the first plurality of coding units.

24. The apparatus of claim 17, wherein the means for coding the first plurality of coding units and coding the second plurality of coding units comprises means for decoding the first plurality of coding units and decoding the second plurality of coding units, the apparatus further comprising:
    means for receiving an indication that the at least one adjacent coding unit in the second plurality of coding units is unavailable for use in intra-prediction coding of the portion of one coding unit in the first plurality of coding units.

25. A non-transitory computer-readable storage medium storing instructions that, when executed, cause one or more processors of a device configured to code video data to:
    determine, for a first plurality of coding units, that at least one adjacent coding unit in a second plurality of coding units is unavailable for use in intra-prediction coding of a portion of one coding unit in the first plurality of coding units;
    determine padding values for pixels located in the second plurality of coding units determined as unavailable for use in intra-prediction coding;
    code a first plurality of coding units in a tile of the video data; and
    code a second plurality of coding units in the tile of the video data after at least one coding unit in the first plurality of coding units is coded, such that coding the second plurality of coding units occurs substantially in parallel with coding the first plurality of coding units,
    wherein coding the first plurality and the second plurality of coding units includes intra-prediction coding, and wherein the intra-prediction coding uses the determined padding values for pixels located in the second plurality of coding units determined as unavailable for use in intra-prediction coding.

26. The non-transitory computer-readable storage medium of claim 25, wherein the portion of the one coding unit in the first plurality of coding units is in a first largest coding unit (LCU), and wherein the at least one adjacent coding unit in the second plurality of coding units is in a second largest coding unit (LCU).

27. The non-transitory computer-readable storage medium of claim 25, wherein the first plurality of coding units in the tile is a first row of coding units in the tile, and wherein the second plurality of coding units in the tile is a second row of coding units in the tile.

28. The non-transitory computer-readable storage medium of claim 27, wherein the portion of the one coding unit in the first plurality of coding units is a transform unit located in the lower left corner of the one coding unit.

29. The non-transitory computer-readable storage medium of claim 25, wherein the first plurality of coding units in the tile is a first column of coding units in the tile, and wherein the second plurality of coding units in the tile is a second column of coding units in the tile.

30. The non-transitory computer-readable storage medium of claim 29, wherein the portion of the one coding unit in the first plurality of coding units is a transform unit located in the upper right corner of the one coding unit.

31. The non-transitory computer-readable storage medium of claim 25, wherein coding the first plurality of coding units and coding the second plurality of coding units comprises encoding the first plurality of coding units and encoding the second plurality of coding units, wherein the instructions further cause the one or more processors to:
   signal an indication that the at least one adjacent coding unit in the second plurality of coding units is unavailable for use in intra-prediction coding of the portion of one coding unit in the first plurality of coding units.

32. The non-transitory computer-readable storage medium of claim 25, wherein coding the first plurality of coding units and coding the second plurality of coding units comprises decoding the first plurality of coding units and decoding the second plurality of coding units, wherein the instructions further cause the one or more processors to:
   receive an indication that the at least one adjacent coding unit in the second plurality of coding units is unavailable for use in intra-prediction coding of the portion of one coding unit in the first plurality of coding units.

\* \* \* \* \*